(12) United States Patent
Findikli (10) Patent No.: US 7,586,896 B2
(45) Date of Patent: *Sep. 8, 2009

(54) SYSTEM FOR MAINTAINING SYNCHRONIZATION BETWEEN MULTIPLE ASYNCHRONOUS COMMUNICATION LINKS

(75) Inventor: Ayse Findikli, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/437,680

(22) Filed: May 22, 2006

(65) Prior Publication Data

US 2006/0209903 A1 Sep. 21, 2006

Related U.S. Application Data

(63) Continuation of application No. 10/101,676, filed on Mar. 19, 2002, now Pat. No. 7,050,420.

(60) Provisional application No. 60/278,362, filed on Mar. 21, 2001.

(51) Int. Cl.
*H04J 3/06* (2006.01)

(52) U.S. Cl. ........................ 370/350; 375/356

(58) Field of Classification Search ................ None
See application file for complete search history.

(56) References Cited

U.S. PATENT DOCUMENTS

| | | | |
|---|---|---|---|
| 6,111,896 A | 8/2000 | Slattery et al. | |
| 6,351,474 B1 * | 2/2002 | Robinett et al. | 370/486 |
| 6,502,155 B1 * | 12/2002 | Kondo et al. | 710/305 |
| 6,542,727 B1 * | 4/2003 | Kikuchi | 455/343.1 |
| 6,577,872 B1 * | 6/2003 | Lundh et al. | 455/502 |
| 6,633,590 B1 | 10/2003 | Garofalo et al. | |
| 6,711,220 B1 * | 3/2004 | Yoshida et al. | 375/354 |
| 6,718,476 B1 * | 4/2004 | Shima | 713/400 |
| 6,944,188 B2 * | 9/2005 | Sinha et al. | 370/503 |
| 6,954,471 B1 * | 10/2005 | Rousselin et al. | 370/503 |
| 7,050,420 B2 * | 5/2006 | Findikli | 370/350 |
| 7,251,256 B1 * | 7/2007 | Barry et al. | 370/503 |

* cited by examiner

*Primary Examiner*—Phirin Sam
(74) *Attorney, Agent, or Firm*—Sterne, Kessler, Goldstein & Fox, P.L.L.C.

(57) ABSTRACT

An apparatus for maintaining synchronization with a plurality of asynchronous communication links includes a first counter that generates a first local network clock, and a second counter that generates a second local network clock. The apparatus also includes an offset controller coupled with the first counter and coupled with the second counter, the offset controller configured to load a current network clock value of a first network clock of a first communication link into the first counter, and to load a current network clock value of a second network clock of a second communication link into the second counter. The apparatus further includes a drift controller coupled with the first counter and with the second counter, the drift controller configured to correct a drift between the first local network clock and the first network clock and to correct a drift between the second local network clock and the second network clock. The first local network clock approximates the first network clock of the first communication link and the second local network clock approximates the second network clock of the second communication link.

15 Claims, 6 Drawing Sheets

FIG. 1

*(Prior Art)*

SYSTEM FOR MAINTAINING SYNCHRONIZATION BETWEEN MULTIPLE ASYNCHRONOUS COMMUNICATION LINKS

CROSS-REFERENCE TO RELATED APPLICATION

This application is a continuation of U.S. Non-Provisional application Ser. No. 10/101,676, filed Mar. 19, 2002, which claims benefit to U.S. Provisional Application No. 60/278,362, filed Mar. 21, 2001, entitled "System for Maintaining Synchronization Between Multiple Asynchronous Communication Links," all of which are herein incorporated by reference in their entirety.

BACKGROUND OF THE INVENTION

The present invention relates generally to electronic circuits. More particularly, the present invention relates to maintaining network synchronization when communicating on multiple networks having asynchronous clocks.

As communications technology continues to advance, greater numbers and additional types of devices are being networked together. Additionally, as the degree of internetworking continues to increase, it is desirable that a device have the capability to be linked with multiple networks. In a consumer electronics environment, for example, a first network might comprise audio electronic components and a second network might comprise a personal computer and peripherals. It may be desirable for the personal computer to be linked with the first network, as well as the second network, so that the personal computer may, for example, transfer audio data to the audio electronic components for playback.

Figure 1:
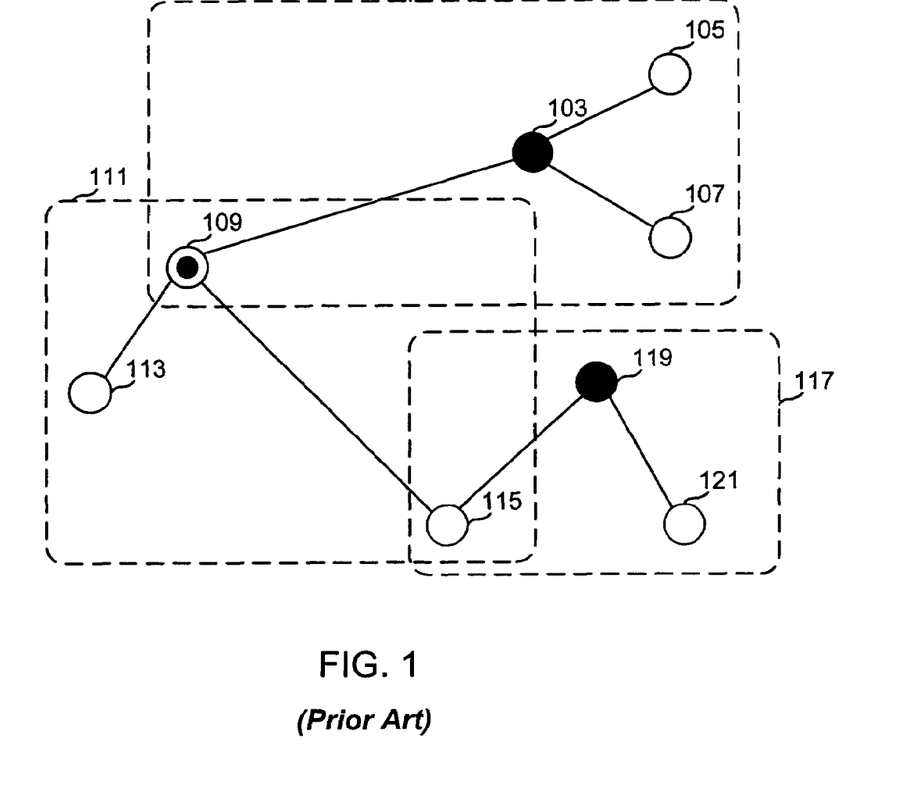
FIG. 1 is a simplified diagram illustrating devices networked in multiple piconets under the Bluetooth protocol.

Different networks may or may not be synchronized with each other. For example, the Bluetooth wireless communications protocol provides for simultaneous asynchronous networks (referred to as "piconets") with overlapping coverage area. FIG. 1 is a simplified diagram illustrating devices networked in multiple piconets under the Bluetooth protocol. A first piconet 101 is comprised of devices 103, 105, 107, and 109. A second piconet 111 is comprised of devices 109, 113, and 115. A third piconet 117 is comprised of devices 115, 119, and 121. As can be seen, device 109 participates in piconets 101 and 111. Also, device 115 participates in piconets 111 and 117.

Each piconet in the Bluetooth protocol has a network clock that is used for synchronizing and scheduling transmissions. Although the network clocks of respective piconets operate at the same frequency, they are not synchronized. Thus, for example, the network clock of piconet 101 will have an offset and drift from the network clock of piconet 111. Because the network clocks of respective piconets are not synchronized, a device linked to multiple piconets must synchronize with multiple asynchronous network clocks of the various piconets. For example, the device 115 must synchronize with the network clock of piconet 111, and must also synchronize with the network clock of piconet 117.

BRIEF SUMMARY OF THE INVENTION

According to an embodiment of the invention, an apparatus for maintaining synchronization with a plurality of asynchronous communication links is provided. The apparatus comprises a first counter that generates a first local network clock, and a second counter that generates a second local network clock. The apparatus also comprises an offset controller coupled with the first counter and coupled with the second counter, the offset controller configured to load a current network clock value of a first network clock of a first communication link into the first counter, and to load a current network clock value of a second network clock of a second communication link into the second counter. The apparatus further comprises a drift controller coupled with the first counter and with the second counter, the drift controller configured to correct a drift between the first local network clock and the first network clock and to correct a drift between the second local network clock and the second network clock, wherein the first local network clock approximates the first network clock of the first communication link and the second local network clock approximates the second network clock of the second communication link.

According to another embodiment of the invention, a method for maintaining synchronization with a plurality of asynchronous communication links is provided. The method includes providing a first counter that generates a first local network clock. The method also includes determining a current value of a first network clock of a first communication link, and loading the current value of the first network clock into the first counter. The method additionally includes adjusting the first counter, as needed, to correct a drift between the first local network clock and the first network clock, wherein the first local network clock approximates the first network clock of the first communication link. The method further includes providing a second counter that generates a second local network clock. The method still further includes determining a current value of a second network clock of a second communication link, and loading the current value of the second network clock into the second counter. The method also includes adjusting the second counter, as needed, to correct a drift between the second local network clock and the second network clock, wherein the second local network clock approximates the second network clock of the second communication link.

Benefits of embodiments of the present invention include providing a method of synchronizing to multiple asynchronous networks that may be simply and efficiently implemented in hardware. Other benefits include providing readily accessible multiple asynchronous network clocks so that traffic scheduling on the multiple networks and avoiding overlapping receive and transmit times amongst multiple networks is simplified. Still other benefits include improving the utilized bandwidth of the multiple asynchronous networks. Other benefits include simplifying the tracking of the relative drifts of the various network clocks.

DETAILED DESCRIPTION OF THE INVENTION

Figure 2:
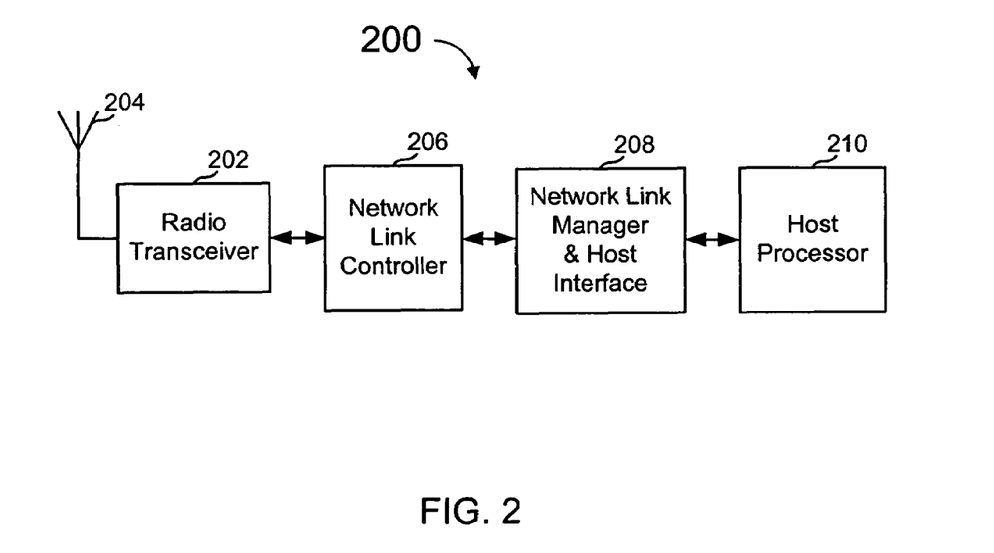
FIG. 2 is a simplified diagram of an exemplary system in which the present invention may be embodied.

FIG. 2 is a simplified diagram of an exemplary system in which the present invention may be embodied. This diagram is merely an illustration which should not limit the scope of the claims herein. One skilled in the art would recognize many other variations, modifications, and alternatives.

The system 200 includes a radio transceiver 202 coupled with an antenna 204 and a network link controller 206. The radio transceiver 202 receives radio frequency (RF) signals via the antenna 204, and converts the RF signals to baseband data signals which are provided to the network link controller 206. Additionally, the radio transceiver 202 receives baseband data signals for transmission from the network link controller 206 and converts the baseband data to an RF signal, which it transmits via the antenna 204.

The network link controller 206 implements low-level communication link protocols. For example, if the communication link protocol utilizes a time division duplex (TDD) scheme, the network link controller 206 may generate timing and control signals that control when radio transceiver 202 transmits data and listens for data. Additionally, if a frequency hop scheme is utilized, the network link controller 206 may generate timing and control signals that control the frequency hop sequence. In typical network communication protocols employing TDD, frequency hop, and/or the like, the required timing is based upon a network clock. Typically, the network clock is generated by one device in the network and the other devices must synchronize to the network clock.

The network link controller 206 is also coupled with the network link manager and host interface 208. The network link manager and host interface 208 implements higher-level network link protocols, such as initiating the creation and ending of network links. The network link manager and host interface 208 also interfaces with a host controller 210. The host controller 210 may implement still higher-level network link protocols and user-level applications.

A system such as the system 200 may be used to implement a communication protocol such as the Bluetooth communication protocol, or the like. The Bluetooth communication protocol provides a system for point-to-point and point-to-multipoint communications. The Bluetooth system is a packet-based communication system, and full duplex communication is accomplished using a TDD scheme. Also, Bluetooth utilizes a frequency hop system to combat interference and fading.

Two or more Bluetooth devices sharing a communications channel form what the Bluetooth specification calls a piconet. One device acts as a master of a piconet, while the other devices in the piconet act as slaves. Each Bluetooth device maintains its own local network clock. But, the timing (e.g. the frequency hop and TDD timing) of the piconet is based upon the network clock of the master. Hence, the slaves in the piconet must synchronize their own network clocks with the master network clock. Referring again to FIG. 1, the piconet 101 comprises a master 103 and slaves 105, 107, and 109. Thus, the master 103 determines the network clock of the piconet 101, and the slaves 105, 107, and 109 must synchronize their own timing with the network clock.

The Bluetooth system permits the simultaneous existence of multiple piconets with overlapping coverage areas, which form what the Bluetooth specification calls a scatternet. The piconets in a scatternet are neither time- nor frequency-synchronized. Rather, each of the piconets in a scatternet operates on a different frequency hop channel with its timing driven by the master of the piconet. A device may participate in different piconets on a time-division multiplex basis. Thus, a device participating in multiple piconets must synchronize its own network clock with that of multiple master network clocks. For example, the device 115 acts as a slave in two piconets: 111 and 117. Hence, the device 115 must synchronize its own local clock with two separate master network clocks.

Figure 3:
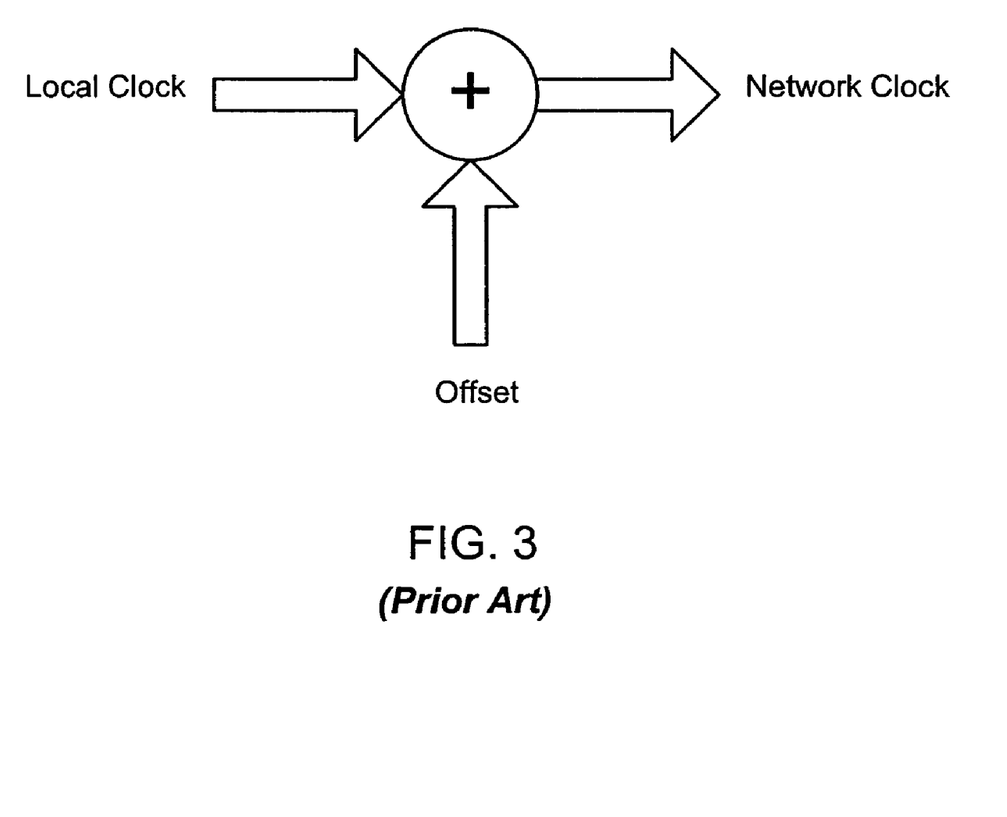
FIG. 3 is an illustration of a method recommended by the Bluetooth specification for synchronizing a slave's clock with that of the master's clock.

The Bluetooth specification recommends a method for synchronizing a slave's clock with that of the master's clock, and the method is illustrated in FIG. 3. The method includes generating a local clock and determining an offset between the local clock and the master network clock. Then, the offset is added to the local clock in order to obtain the master network clock. To correct for drift between the local clock and the master network clock, the offset may be adjusted as needed. In the system 200 illustrated in FIG. 2, the generation of a local clock and the synchronization of the local network clock with master clocks would typically be carried out by the network link controller 206.

But the implementation of FIG. 2 becomes awkward when supporting the ability for simultaneous communication on multiple piconets.

Figure 4:
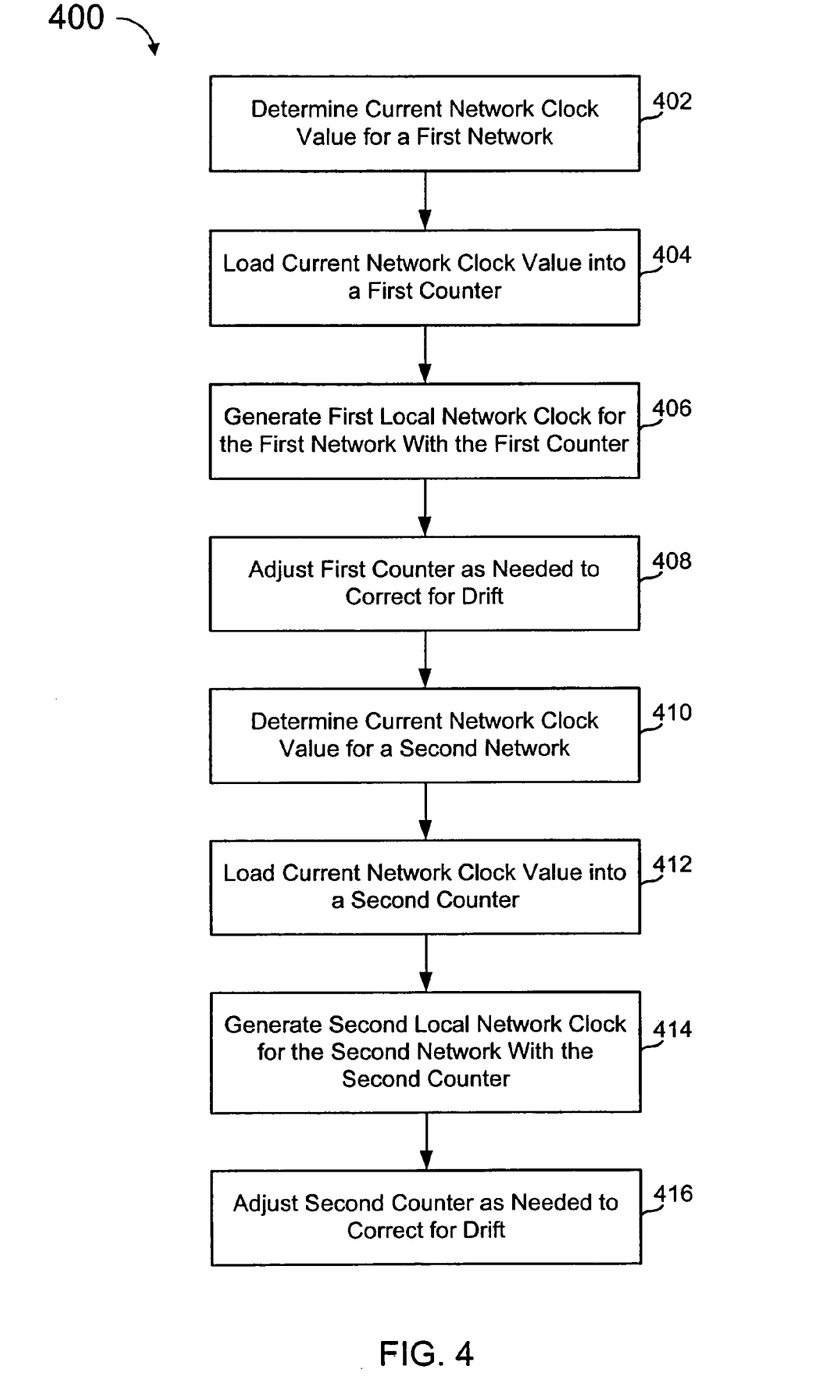
FIG. 4 illustrates the flow of a method for synchronizing with two separate network clocks.

FIG. 4 is a simplified flow diagram of a method according to an embodiment of the invention. This diagram is merely an illustration which should not limit the scope of the claims herein. One skilled in the art would recognize many other variations, modifications, and alternatives.

FIG. 4 illustrates the flow of a method for synchronizing with two separate network clocks. One skilled in the art would recognize that the method can easily be extended to permit synchronization with three or more network clocks. In a step 402, a current network clock value for a first network is determined. In one embodiment, the current network clock value is determined by extracting the current network clock value from a data transmission received via the first network. For example, in the Bluetooth communication network protocol, when a device initiates a connection with other devices, it transmits its current clock value to the other devices. The initiating device becomes the master, and its clock becomes the network clock of the piconet. Thus, the slave devices may determine the current network clock by extracting the clock value sent by the master device. Similarly, in other network protocols, transmissions may be time-stamped with the current network clock. Thus, the current network clock may be determined by extracting and analyzing the time stamp of a data transmission. In another embodiment, the current network clock may be determined by additionally adjusting the clock value extracted from a data transmission to account for system delays.

Next, in a step 404, the network clock value determined in step 402 is loaded into a first counter. In one embodiment, the network clock value is loaded into the first counter via a parallel load input of the first counter. Then, in a step 406, the first counter generates a first local network clock that tracks the network clock of the first network. In order to generate a first local clock that tracks the network clock of the first network, the first counter is chosen before-hand and/or programmed to roll over at the same count value as the network clock. Additionally, the first counter should count at substantially the same rate as the network clock of the first network. For example, in the Bluetooth protocol, network clocks are defined to roll over at the same value and to count at the same rate. Thus, in an embodiment that implements the Bluetooth protocol, the first counter is chosen or configured to count at the Bluetooth count rate and to roll over at the appropriate count value. As is well known in the art, the first local clock generated by the first counter will tend to drift over time from the network clock of the first network. Thus, in a step 408, the first counter is adjusted, as needed, to correct for such a drift.

If synchronization with a second network is required, steps 410, 412, 414, and 416 are performed. Steps 410, 412, 414, and 416 are similar to steps 402, 404, 406, and 408, respectively. In step 410, a current network clock value for a second network is determined. Then, in a step 412, the network clock value determined in step 410 is loaded into a second counter. Next, in a step 414, the second counter generates a second local network clock that tracks the network clock of the second network in a manner similar to that as discussed with regard to step 406. Also, the second counter is adjusted, as needed, to correct for a drift between the second local network clock and the network clock of the second network.

The method 400 provides a number of advantages. Because two separate counters are utilized, the current clocks and timings of the two networks are available at any given time. Hence, to switch between the first network and the second network, a system implementing the method 400 need only switch between the outputs of the first and second counters, which may be simply and efficiently implemented in hardware. Additionally, because the two network clocks are readily available, the scheduling of traffic on the two networks becomes easier and may be improved. Hence, the utilized bandwidth may also be improved. Similarly, it becomes easier to avoid problems of overlapping receive and transmit times of the first and second networks. Moreover, the tracking of the relative drifts of the various network clocks is simplified. These advantages become even more pronounced when the method 400 is extended to track the network clocks of three or more networks.

Figure 5:
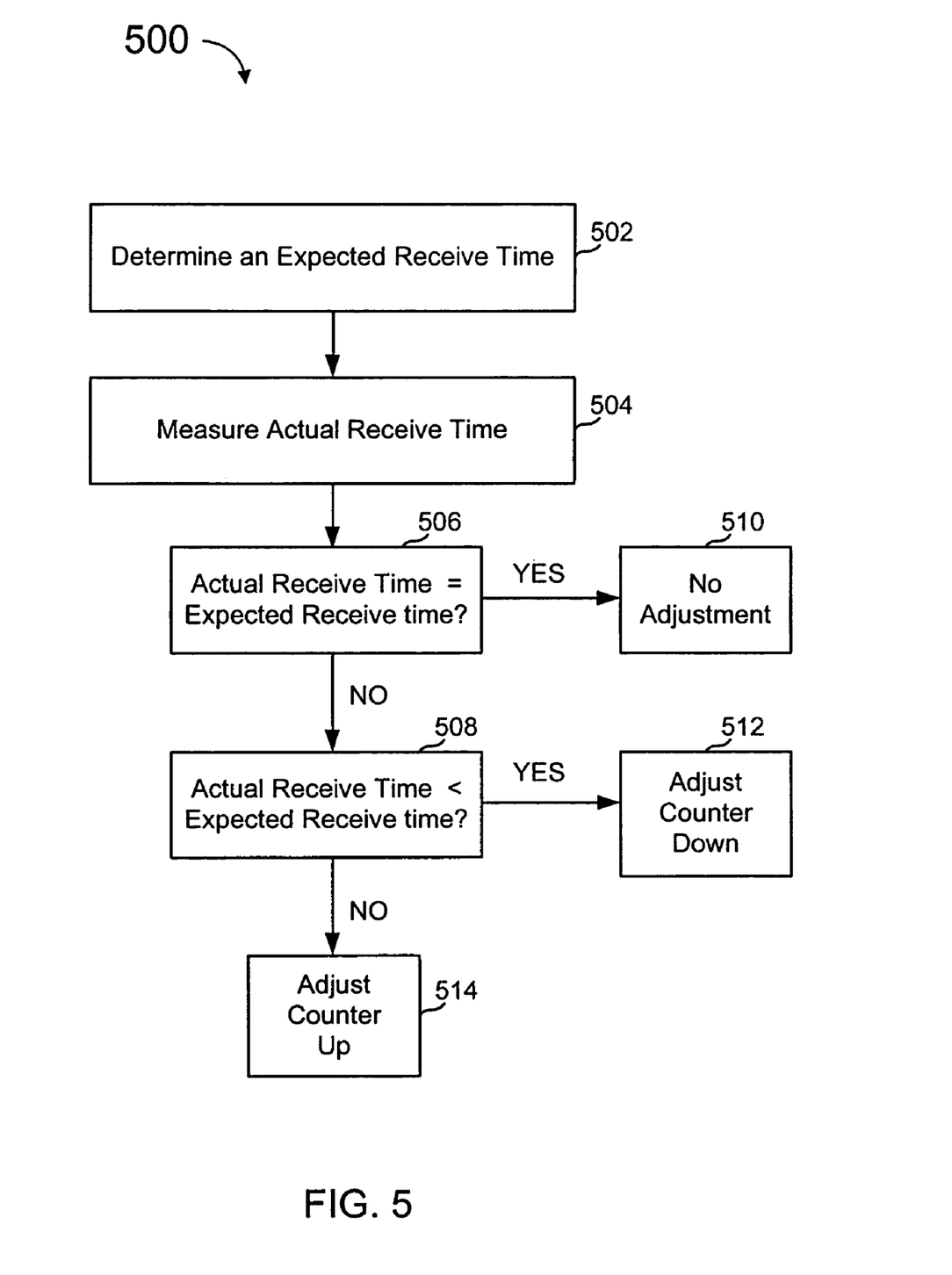
FIG. 5 is a simplified flow diagram of one embodiment of a method for adjusting a counter to account for a drift between its output and the network clock it tracks.

Any number of methods for adjusting a counter to account for a drift between its output and the network clock it tracks known to those skilled in the art may be used to implement steps 408 and 416. FIG. 5 is a simplified flow diagram of one embodiment of a method that may be utilized. This diagram is merely an illustration which should not limit the scope of the claims herein. One skilled in the art would recognize many other variations, modifications, and alternatives.

In a step 502, an expected receive time of a transmission is determined based upon the local network clock generated by the counter. For example, in a TDD communication protocol such as the Bluetooth protocol, certain time slots, based upon the network clock, are reserved for transmissions from the master device to a slave device. Thus, the slave device may determine the time, based upon its local network clock, that a transmission from the master device should arrive.

In a step 504, the actual time, based upon the local clock, at which the transmission is received is measured. Then, the actual time that the transmission was received is compared with the expected time in steps 506 and 508. If the actual time is equal to the expected time, then no adjustment to the local clock is required. However, if the actual time of reception is less than the expected time (i.e. actual reception occurred before the expected time), then the local clock is slow with respect to the network clock. Thus, the local clock should be adjusted by causing the counter to count up one count. Similarly, if the actual time of reception is more than the expected time (i.e. actual reception occurred after the expected time), then the local clock is fast with respect to the network clock. Hence, the local clock should be adjusted by causing the counter to count down one count.

Figure 6:
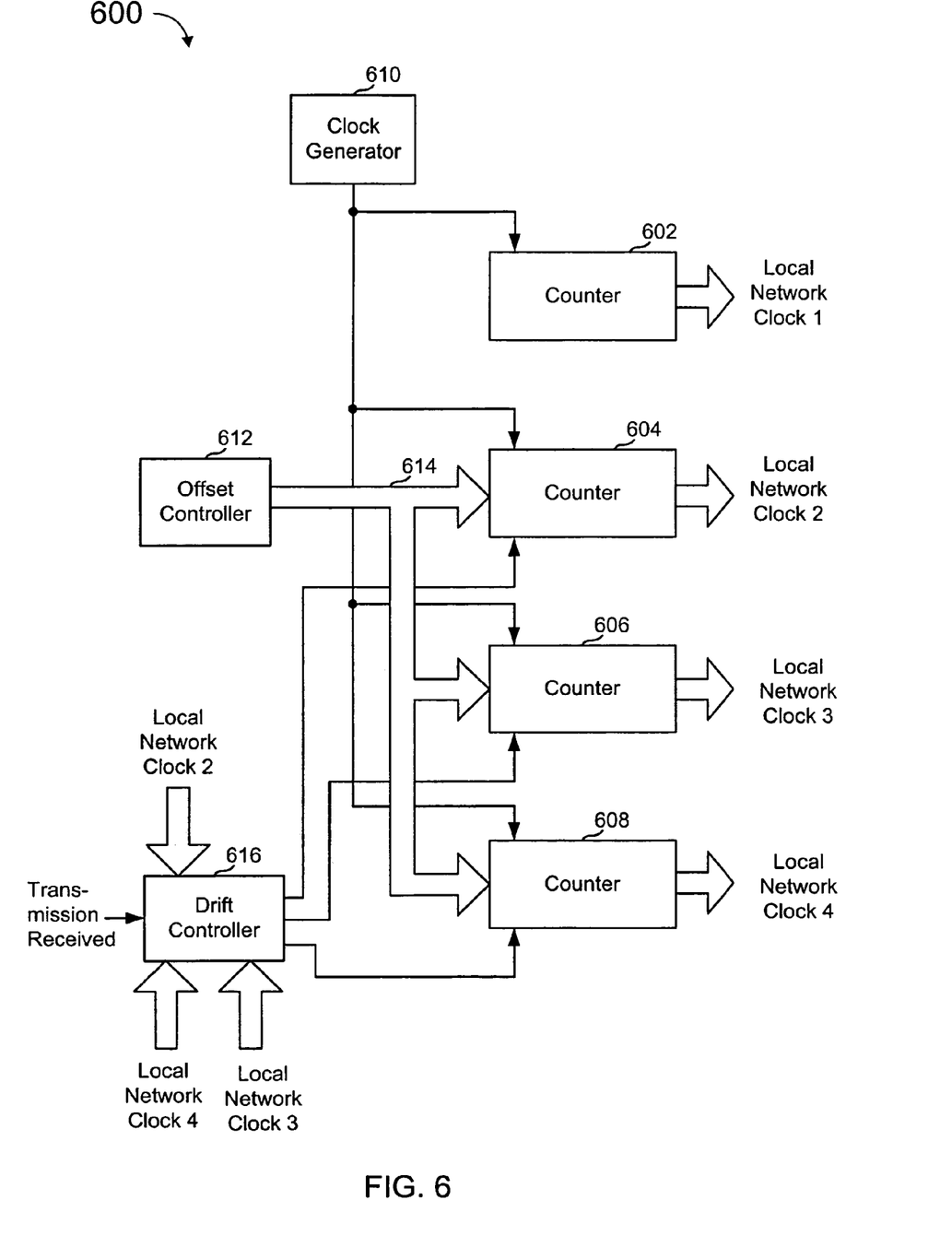
FIG. 6 is a simplified diagram illustrating an embodiment of an apparatus for maintaining synchronization with multiple asynchronous networks.

FIG. 6 is a simplified diagram illustrating an embodiment according to the invention. This diagram is merely an illustration which should not limit the scope of the claims herein. One skilled in the art would recognize many other variations, modifications, and alternatives.

FIG. 6 illustrates an embodiment of an apparatus for maintaining synchronization with multiple asynchronous networks that may be included in, for example, the network link controller 206 of FIG. 2. The apparatus 600 includes counters 602, 604, 606, and 608 that generate local network clock 1, local network clock 2, local network clock 3, and local network clock 4, respectively. Each local network clock can provide timing information for a separate communication link. Thus, this embodiment supports simultaneous communication with up to four asynchronous communication links. Although the embodiment includes four counters, other embodiments may include more or less counters, depending upon how many simultaneous connections with asynchronous communication links are desired to be supported.

Each of the counters 604, 606, and 608 is configured to generate a local network clock that may track a network clock. Whereas, the counter 602 is not configured to track another network clock. The local network clock generated by counter 602 may be used, for example, as a network clock when a device that includes the apparatus 600 is a master of a network. Each of the counters 604, 606, and 608 includes a parallel load input, that permits a current network clock value to be loaded into the counter, as discussed with respect to steps 404 and 412 in FIG. 4. Additionally, each of the counters 604, 606, and 608 includes count adjust inputs that permit the local network clock generated by the counter to be adjusted. The count adjust inputs of a counter are used to correct for a drift between the local network clock and the network clock it tracks, as was discussed with respect to steps 408 and 416 in FIG. 4. In one embodiment that supports the Bluetooth communication protocol, each of the counters 602, 604, 606, and 608 is a 28-bit counter.

The apparatus 600 also includes a clock generator 610 coupled with each of the counters 602, 604, 606, and 608. The clock generator 610 generates a clock signal that drives the counters. In an embodiment that supports the Bluetooth communication protocol, the clock generator may generate a clock signal having a frequency of 3.2 kHz.

The apparatus 600 further includes an offset controller 612 coupled with the parallel inputs of the counters 604, 606, and 608. The offset controller 612 determines a current network clock value as discussed with respect to steps 402 and 410 in FIG. 4. Additionally, the offset controller 612 loads the determined current network clock value into the appropriate counter via a bus 614 and the parallel load input of the counter. In one embodiment, the offset controller may adjust the current network clock value prior to loading it into the respective counter in order, for example, to account for a time delays. Such delays may include system delays, a delay in determining the current network clock value, a delay in loading it into the counter, etc. In the embodiment shown in FIG. 6, the offset controller 612 is coupled with the parallel load inputs of all of the counters 604, 606, and 608 via the bus 614. Hence, a plurality of select signals (not shown) are generated to select the appropriate counter into which the offset controller 612 will load a current network clock value. Although the offset controller 612 has been illustrated as a single block, the offset controller 612 may comprise multiple blocks. For example, the offset controller 612 may comprise three separate blocks, one corresponding to each of the counters 604, 606, and 608.

The apparatus 600 further includes a drift controller 616. The drift controller 616 receives a control signal that indicates when a transmission has been received, and also receives the local network clocks generated by the counters 604, 606, and 608. The drift controller 616 generates control signals that are coupled with the counters 604, 606, and 608 for separately adjusting each of the counters 604, 606, and 608 as discussed with respect to steps 408 and 416 in FIG. 4. In one embodiment, the drift controller 616 implements the flow shown in FIG. 5. Although the drift controller 616 has been illustrated as a single block, the drift controller 616 may comprise multiple blocks. For example, the drift controller 616 may comprise three separate blocks, one corresponding to each of the counters 604, 606, and 608.

The operation of the apparatus 600 will now be discussed with reference to FIGS. 1 and 6. Say, for example, that the device 109 includes the apparatus 600. Also, say that in the network 111, device 109 is responsible for generating the network clock and that devices 113 and 115 must synchronize to that network clock. Because in network 111, the device 109 is not required to synchronize with another network clock, the counter 602 can be used to generate the network clock for the network 111.

But say that, during the operation of network 111, the device 109 is invited to join network 101, which has its own network clock. Thus, within the network 101, the device 109 must synchronize with the network clock of 101. The device 109 can use the counter 604 to track the network clock of network 101. First, the offset controller 612 determines the current network clock value for the network 101. As discussed with respect to steps 402 and 410 of FIG. 4, the current network clock value may be determined by, for example, extracting a time stamp from a transmission received from device 103. Then, the offset controller 612 loads the current network clock value into the counter 604. After loading the current network clock value into the counter 604, the counter 604 then generates the local network clock 2 which approximates the network clock of network 101.

Additionally, the drift controller 616 adjusts the counter 604 to correct for drift over time between the local network clock 2 and the network clock of network 101, as discussed with respect to steps 408 and 416 of FIG. 4. For example, the counter 604 may be adjusted in a manner similar to that discussed with respect to FIG. 5 each time a transmission from the device 103 is received. The drift controller 616 may determine an expected receive time for a transmission from the device 103 based upon the local network clock 2. Then, the drift controller 616 may measure an actual receive time of the transmission based upon the local network clock 2. Next, based upon the difference between the expected and actual receive times, the drift controller adjusts the count of the counter 604, if needed.

When the device 109 needs to communicate via the network 111, the local network clock 1 generated by the counter 602 can be referenced. And, when the device 109 needs to communicate via the network 101, the local network clock 2 generated by the counter 604 can be referenced.

Counter 606 and 608 are similarly available for simultaneous communication via additional networks. For example, while still linked with the networks 101 and 111, the device 109 may be invited to join two more networks. The counters 606 and 608 may be utilized to generate local network clocks for the two additional networks. Thus, the apparatus 600 provides timing information for simultaneous communication via (up to and including) four separate, asynchronous networks. As can be seen in FIG. 6, the outputs of the counters 602, 604, 606, and 608 are readily available. Therefore, when the device 109 switches between communicating on various networks, the device 109 need only switch between the outputs of the various counters to obtain the correct network clock. One skilled in the art will recognize that this switching scheme may simply and efficiently be implemented in hardware. Additional advantages are provided by the ready availability of the various network clocks. For instance, the network clocks may be employed in preventing overlapping transmit and receive times between two networks and in scheduling traffic amongst the various networks, thus improving bandwidth utilization.

Figure 7:
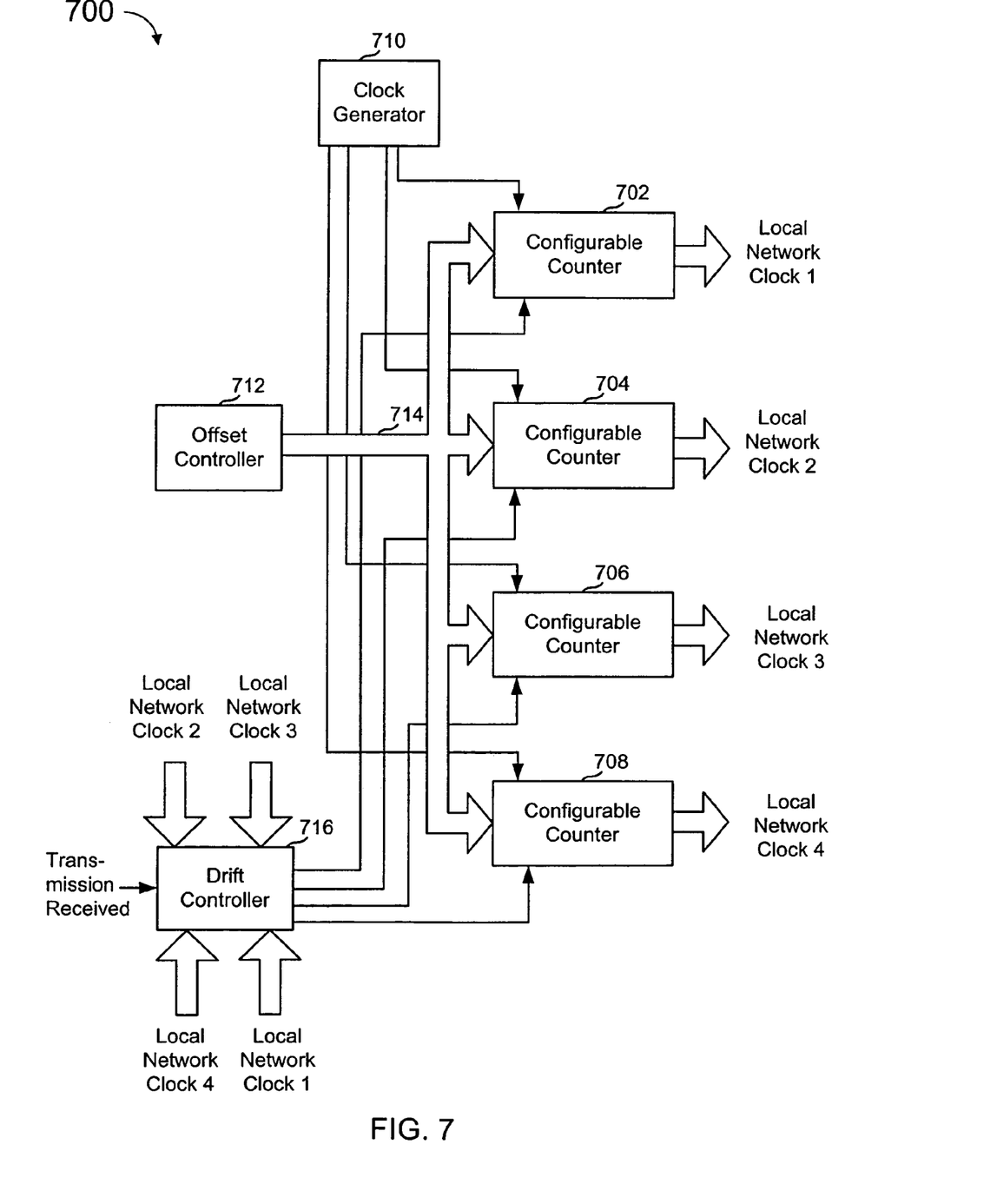
FIG. 7 is a simplified diagram illustrating another embodiment of an apparatus for maintaining synchronization with multiple asynchronous networks.

FIG. 7 is a simplified diagram illustrating another embodiment according to the invention. This diagram is merely an illustration which should not limit the scope of the claims herein. One skilled in the art would recognize many other variations, modifications, and alternatives.

FIG. 7 illustrates another embodiment of an apparatus for maintaining synchronization with multiple asynchronous networks that may be included in, for example, the network link controller 206 of FIG. 2. The apparatus 700 can be programmed to generate network timing signals for networks having different network clock count rates and roll-over values. The apparatus 700 may be used, for example, in a communication device that operates in different network communication protocols, either simultaneously, or at different times.

The apparatus 700 includes configurable counters 702, 704, 706, and 708 that generate local network clock 1, local network clock 2, local network clock 3, and local network clock 4, respectively. As with the apparatus shown in FIG. 6, each local network clock can provide timing information for a separate communication link. Although the embodiment includes four configurable counters, other embodiments may include more or less counters, depending upon how many simultaneous connections with asynchronous communication links are desired.

Each of the configurable counters 702, 704, 706, and 708 may be programmably configured to generate a local network clock that may track a network clock. Various network clocks may count at different rates and have different values at which the count rolls over back to zero, depending upon the particular network protocol being implemented. Therefore, configurable counters 702, 704, 706, and 708 may each be separately configured to roll over at different values. Additionally, each of the configurable counters 702, 704, 706, and 708 may be driven at a different count rate. Particularly, a clock generator 710 is provided that generates four separate clock signals, each driving one of the configurable counters 702, 704, 706, and 708. Additionally, the clock generator 710 may be programmably configured to generate clocks having various frequencies on each of the four clock signals. Thus, each of the configurable counters 702, 704, 706, and 708 may be driven at a particular count rate, and configured to roll over at a particular value. For example, the configurable counter 702 could be configured as a 28-bit counter and the configurable counter 704 as a 29-bit counter. Additionally, the clock generator 710 may be configured to generate a 3.2 kHz clock signal that drives the counter 702 and a 6.4 kHz clock signal that drives the counter 704.

Although the clock generator 710 has been illustrated as a single block, the clock generator 710 may comprise multiple blocks. For example, the clock generator 710 may comprise four separate clock generators, each clock generator generating a clock for one of the counters 702, 704, 706, and 708.

Similar to the apparatus shown in FIG. 6, each of the counters 702, 704, 706, and 708 includes a parallel load input, that permits a current network clock value to be loaded into the counter, as discussed with respect to steps 404 and 412 in FIG. 4. Additionally, similar to the apparatus shown in FIG. 6, each of the counters 702, 704, 706, and 708 includes count adjust inputs that permit the local network clock generated by the counter to be adjusted.

Similar to the apparatus shown in FIG. 6, the apparatus 700 further includes an offset controller 712 coupled with the parallel inputs of the counters 702, 704, 706, and 708. The offset controller 712 determines a current network clock value as discussed with respect to steps 402 and 410 in FIG. 4. Then, the offset controller 712 loads the current network clock value into the appropriate counter via a bus 714 and the parallel load input of the counter. In one embodiment, the offset controller may adjust the current network clock value prior to loading it into the respective counter in order, for example, to account for a time delay between determining the network clock value and loading it into the counter. In the embodiment shown in FIG. 7, the offset controller 712 is coupled with the parallel load inputs of all of the counters 702, 704, 706, and 708 via the bus 714. Hence, a plurality of select signals (not shown) are generated to select the appropriate counter into which the offset controller 712 will load a current network clock value. Although the offset controller 712 has been illustrated as a single block, the offset controller 712 may comprise multiple blocks. For example, the offset controller 712 may comprise four separate blocks, one corresponding to each of the counters 702, 704, 706, and 708.

Similar to the apparatus shown in FIG. 6, the apparatus 700 further includes a drift controller 716. The drift controller 716 receives a control signal that indicates when a transmission has been received, and also receives the local network clocks generated by the counters 702, 704, 706, and 708. The drift controller 716 generates control signals that are coupled with the counters 702, 704, 706, and 708 for separately adjusting each of the counters 702, 704, 706, and 708 as discussed with respect to steps 408 and 416 in FIG. 4. In one embodiment, the drift controller 716 implements the flow shown in FIG. 5. Although the drift controller 716 has been illustrated as a single block, the drift controller 716 may comprise multiple blocks. For example, the drift controller 716 may comprise four separate blocks, one corresponding to each of the counters 702, 704, 706, and 708.

The operation of the apparatus 700 is similar to that of the apparatus 600 illustrated in FIG. 6. However, the apparatus 700 may be programmably configured to track network clocks of various count rates and roll-over values. For example, the apparatus 700 could be pre-programmed to operate with a particular network communication protocol. Alternatively, the apparatus 700 could be dynamically programmed to operate with a various network communication protocols as needed.

The invention has now been explained with reference to specific embodiments. Other embodiments will be apparent to those of ordinary skill in the art. Therefore it is not intended that this invention be limited except as indicated by the appended claims.

What is claimed is:

1. An apparatus for maintaining synchronization with an asynchronous communication link, the apparatus comprising:
    a first counter that generates a master network clock of a first network;
    a second counter that generates a local network clock of a second network;
    an offset controller coupled with the second counter, the offset controller configured to load a current network clock value of a network clock of a communication link into the second counter; and
    a drift controller coupled with the second counter, the drift controller configured to correct a drift between the local network clock and the network clock of the communication link;
    wherein the local network clock approximates the network clock of the communication link.

2. The apparatus of claim 1, wherein the second counter includes a parallel load input, and wherein the offset controller is coupled with the parallel load input of the second counter.

3. The apparatus of claim 1, wherein the offset controller is configured to determine the current network clock value of the second network.

4. The apparatus of claim 3, wherein the offset controller determines the current network clock value of the second network based upon a time stamp of the transmission received via the communication link.

5. The apparatus of claim 1, wherein the second counter may be programmably configured to change a roll-over value of the local network clock.

6. The apparatus of claim 1, wherein the drift controller is configured to determine an expected receive time of a transmission via the communication link and to compare the expected receive time with an actual receive time of the transmission.

7. The apparatus of claim 1, further comprising a clock generator that generates a first clock and a second clock, the first clock coupled with the first counter and driving the first counter at a first rate, and the second clock coupled with the second counter and driving the second counter at a second rate.

8. The apparatus of claim 7, wherein the clock generator may be programmably configured to change the value of the first and second rates.

9. The apparatus of claim 7, wherein the first clock and the second clock are the same signal.

10. The apparatus of claim 7, wherein the clock generator comprises a first clock generator that generates the first clock and a second clock generator that generates the second clock.

11. A method for maintaining synchronization with an asynchronous communication link, the method comprising:
    providing a first counter that generates a master network clock;
    providing a second counter that generates a local network clock;
    determining a current value of a network clock of a communication link;
    loading the current value of the network clock of the communication link into the second counter; and
    adjusting the second counter, as needed, to correct a drift between the local network clock and the network clock of the communication link, wherein the local network clock approximates the network clock of the communication link.

12. The method of claim 11, wherein the determining step includes obtaining a time-stamp of a transmission via the communication link.

13. The method of claim 12, wherein the determining step further includes adjusting the time-stamp.

14. The method of claim 11, further comprising configuring the second counter so that a roll-over value of the local network clock equals a roll-over value of the network clock of the communication link.

15. The method of claim 11 further comprising configuring a clock generator that drives the second counter so that a rate of the local network clock equals a rate of the network clock of the communication link.

* * * * *

UNITED STATES PATENT AND TRADEMARK OFFICE
CERTIFICATE OF CORRECTION

PATENT NO. : 7,586,896 B2  Page 1 of 1
APPLICATION NO. : 11/437680
DATED : September 8, 2009
INVENTOR(S) : Ayse Findikli It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 19 days.

Signed and Sealed this

Fourteenth Day of December, 2010

David J. Kappos
*Director of the United States Patent and Trademark Office*